(12) United States Patent
Kuribara et al.

(10) Patent No.: US 9,827,860 B2
(45) Date of Patent: Nov. 28, 2017

(54) VEHICLE INCLUDING CHARGER AND ELECTRONIC CONTROL UNIT CONFIGURED TO CONTROL THE CHARGER, AND CONTROL METHOD FOR CONTROLLING CHARGER OF VEHICLE

(71) Applicant: Toyota Jidosha Kabushiki Kaisha, Toyota-shi, Aichi-ken (JP)

(72) Inventors: Fumiyoshi Kuribara, Toyota (JP); Shigetaka Asano, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/462,199

(22) Filed: Mar. 17, 2017

(65) Prior Publication Data

US 2017/0274785 A1 Sep. 28, 2017

(30) Foreign Application Priority Data

Mar. 22, 2016 (JP) .................... 2016-057201

(51) Int. Cl.
*B60L 11/18* (2006.01)
*B60L 11/12* (2006.01)
*B60K 6/46* (2007.10)

(52) U.S. Cl.
CPC ............ *B60L 11/1814* (2013.01); *B60K 6/46* (2013.01); *B60L 11/123* (2013.01); *B60L 11/1812* (2013.01); *B60L 11/1861* (2013.01); *B60L 2210/10* (2013.01); *B60L 2240/54* (2013.01); *B60Y 2200/92* (2013.01); *B60Y 2300/91* (2013.01); *B60Y 2400/112* (2013.01); *Y10S 903/904* (2013.01)

(58) Field of Classification Search
CPC combination set(s) only.
See application file for complete search history.

(56) References Cited

U.S. PATENT DOCUMENTS

| 6,659,213 B2* | 12/2003 | Kubo | ........................ B60K 6/28 180/65.26 |
| 2002/0157882 A1* | 10/2002 | Kubo | ........................ B60K 6/24 180/65.245 |

(Continued)

FOREIGN PATENT DOCUMENTS

| JP | 2011-259612 A | 12/2011 |
| WO | 2013/098904 A1 | 7/2013 |

*Primary Examiner* — Thomas G Black
*Assistant Examiner* — Ana Thomas
(74) *Attorney, Agent, or Firm* — Dinsmore & Shohl LLP

(57) ABSTRACT

A vehicle includes a high voltage battery, a charger and an ECU. When electric power from an external power supply is equal to or less than first predetermined electric power and first power feeding control to feed electric power to a low voltage system power line is performed, the ECU is configured to control the charger to: continue the drive of the charger when a first predetermined time has not elapsed from a start of the first power feeding control or when charged electric power of the high voltage battery is greater than second predetermined electric power that is smaller than the first predetermined electric power after the first predetermined time has elapsed; and stop the drive of the charger when the charged electric power of the high voltage battery is equal to or less than the second predetermined electric power after the first predetermined time has elapsed.

4 Claims, 3 Drawing Sheets

(56) References Cited

U.S. PATENT DOCUMENTS

| | | | |
|---|---|---|---|
| 2011/0169448 A1* | 7/2011 | Ichikawa | B60K 6/365 320/109 |
| 2012/0049771 A1* | 3/2012 | Komatsu | B60K 6/365 318/139 |
| 2012/0143425 A1* | 6/2012 | Yamamoto | B60K 6/365 701/22 |
| 2013/0106365 A1* | 5/2013 | Ang | B60L 3/0069 320/138 |
| 2013/0257375 A1* | 10/2013 | Ang | H02J 7/022 320/109 |
| 2014/0180517 A1* | 6/2014 | Endo | B60W 20/1062 701/22 |

* cited by examiner

US 9,827,860 B2

VEHICLE INCLUDING CHARGER AND ELECTRONIC CONTROL UNIT CONFIGURED TO CONTROL THE CHARGER, AND CONTROL METHOD FOR CONTROLLING CHARGER OF VEHICLE

CROSS-REFERENCE TO RELATED APPLICATIONS

This application claims priority to Japanese Patent Application No. 2016-057201 filed on Mar. 22, 2016, the entire contents of which are hereby incorporated by reference.

BACKGROUND

1. Technical Field

The present disclosure relates to a vehicle, and in particular, to a vehicle with a motor, a high voltage battery, a charger, a low voltage battery, and two direct current to direct current converters (hereinafter, referred to as DC-to-DC converters), and a control method for a vehicle.

2. Description of Related Art

As such a kind of vehicle, a vehicle provided with a motor for traveling, an assembled battery connected to the motor through a first power line, a charger connected to the first power line and configured to charge the assembled battery using electric power from an external power supply, an accessory battery connected to a second power line, a first DC-to-DC converter configured to supply electric power of the first power line to the second power line with deboosting a voltage, and a second DC-to-DC converter incorporated in the charger and configured to supply electric power of the first power line to the second power line with deboosting a voltage has been suggested (for example, see International Publication No. 2013-098904 (WO 2013-098904 A)).

SUMMARY

In such a vehicle, there are many cases where a DC-to-DC converter having a rated output smaller than that of the first DC-to-DC converter is used as the second DC-to-DC converter. For this reason, while the charger is being driven, when the accessory battery needs to be charged, it is considered to drive the first DC-to-DC converter. When electric power from the external power supply is comparatively small and electric power supplied to the second power line is comparatively large, the charged electric power of the assembled battery may become comparatively small temporarily (over a certain amount of time) (for example, becomes near zero or minus). For this reason, in a case of a specification in which the drive of the charger is stopped when the charged electric power of the assembled battery becomes comparatively small even before charging of the assembled battery is completed, there is a possibility that charging of the assembled battery is not sufficiently performed.

A vehicle and a control method for a vehicle of the present disclosure are to prevent the drive of a charger from being stopped without sufficiently charging a high voltage battery when electric power from an external power supply is comparatively small.

A vehicle according to an aspect of the present disclosure includes a motor for traveling, a high voltage battery connected to the motor through a high voltage system power line, a charger connected to the high voltage system power line and configured to charge the high voltage battery using electric power from an external power supply, a low voltage battery connected to a low voltage system power line, a first DC-to-DC converter, a second DC-to-DC converter, and an electronic control unit. The first DC-to-DC converter is connected to the high voltage system power line and the low voltage system power line and is configured to supply electric power of the high voltage system power line to the low voltage system power line with deboosting a voltage. The second DC-to-DC converter is connected to a location of the high voltage system power line on the charger side from the first DC-to-DC converter and the low voltage system power line. The second DC-to-DC converter has a rated output smaller than that of the first DC-to-DC converter. The second DC-to-DC converter is configured to supply electric power of the high voltage system power line to the low voltage system power line with deboosting a voltage. The electronic control unit is configured to control the charger to drive when the charger and the external power supply are connected. The electronic control unit is configured to perform first power feeding control so as to feed electric power to the low voltage system power line by driving the first DC-to-DC converter when the charger is driven and when the low voltage battery has to be charged. When the charger is driven, electric power from the external power supply is equal to or less than first predetermined electric power, and the first power feeding control is performed, the electronic control unit is configured to: i) control the charger such that the drive of the charger is continued when a first predetermined time has not elapsed from the start of the first power feeding control; ii) control the charger such that the drive of the charger is continued when charged electric power of the high voltage battery is greater than second predetermined electric power after the first predetermined time has elapsed from the start of the first power feeding control, the second predetermined electric power being smaller than the first predetermined electric power; and iii) control the charger such that the drive of the charger is stopped when the charged electric power of the high voltage battery is equal to or less than the second predetermined electric power after the first predetermined time has elapsed from the start of the first power feeding control.

In the vehicle of the present disclosure, the charger and the external power supply are connected to drive the charger, and when the low voltage battery has to be charged, the first power feeding control (or first power feeding processing) for feeding electric power to the low voltage system power line by driving the first DC-to-DC converter is performed. When the charger is driven, electric power from the external power supply is equal to or less than the first predetermined electric power, and the first power feeding control is performed (hereinafter, referred to as "predetermined time period"), and when a predetermined time has not elapsed from the start of the first power feeding control and when the charged electric power of the high voltage battery is greater than the second predetermined electric power smaller than the first predetermined electric power after the predetermined time has elapsed from the start of the first power feeding control, the drive of the charger is continued. That is, when the predetermined time has not elapsed from the start of the first power feeding control, even when the charged electric power of the high voltage battery is equal to or less than the second predetermined electric power, the drive of the charger is continued (the drive of the charger is not stopped). With this, when electric power from the external power supply is comparatively small, it is possible to prevent the drive of the charger from being stopped without sufficiently charging the high voltage battery. In the above-described predetermined time period, when the charged electric power of the high voltage battery is equal to or less than the second predetermined electric power after the predetermined time has elapsed from the start of the first power feeding control, the drive of the charger is stopped. In a case where the "predetermined time" is determined as a time required for charging the low voltage battery through the first power feeding control or a time slightly longer than the time, after the predetermined time has elapsed from the start of the first power feeding control, it is considered that charging of the low voltage battery is completed, it is not necessary to supply very large electric power to the low voltage system power line, and the charged electric power of the high voltage battery becomes large to some extent. Accordingly, when the charged electric power of the high voltage battery is equal to or less than the second predetermined electric power after the predetermined time has elapsed from the start of the first power feeding control, it is considered that any abnormality occurs or the operation of an accessory (an accessory having comparatively large power consumption) connected to the low voltage system power line is continued. For this reason, the drive of the charger is stopped, thereby preventing wasteful power feeding from the external power supply from being continued.

In the above-described aspect, the electronic control unit may be configured to perform second power feeding control so as to feed electric power to the low voltage system power line by drive of the second DC-to-DC converter when the charger is controlled and driven and the low voltage battery does not need to be charged. The electronic control unit may be configured to control the charger to drive when the charger is controlled and driven, electric power from the external power supply is equal to or less than the first predetermined electric power, the second power feeding control is performed, and the charged electric power of the high voltage battery is greater than the second predetermined electric power. The electronic control unit may be configured to control the charger to stop the drive of the charger when the charger is controlled and driven, electric power from the external power supply is equal to or less than the first predetermined electric power, the second power feeding control is performed, and the charged electric power of the high voltage battery is equal to or less than the second predetermined electric power.

In this case, when the second power feeding control is performed, this means that it is not necessary to supply very large electric power to the low voltage system power line, and it is considered that the charged electric power of the high voltage battery becomes large to some extent. Accordingly, when the charged electric power of the high voltage battery is equal to or less than the second predetermined electric power, it is considered that any abnormality is likely to occur. For this reason, the drive of the charger is stopped, thereby preventing wasteful power feeding from the external power supply from being continued.

In the above-described aspect, the electronic control unit may be configured to compare the charged electric power of the high voltage battery with the second predetermined electric power after the second predetermined time has elapsed from the start of the second power feeding control, while the second power feeding control is performed. The second predetermined time may be a time shorter than the first predetermined time.

In a control method for a vehicle according to another aspect of the present disclosure, the vehicle includes a motor for traveling, a high voltage battery connected to the motor through a high voltage system power line, a charger connected to the high voltage system power line and configured to charge the high voltage battery using electric power from an external power supply, a low voltage battery connected to a low voltage system power line, a first DC-to-DC converter, a second DC-to-DC converter, and an electronic control unit. The first DC-to-DC converter is connected to the high voltage system power line and the low voltage system power line. The first DC-to-DC converter is configured to supply electric power of the high voltage system power line to the low voltage system power line with deboosting a voltage. The second DC-to-DC converter is connected to a location of the high voltage system power line on the charger side from the first DC-to-DC converter and the low voltage system power line. The second DC-to-DC converter has a rated output smaller than a rated output of the first DC-to-DC converter. The second DC-to-DC converter is configured to supply electric power of the high voltage system power line to the low voltage system power line with deboosting a voltage. The control method includes controlling the charger, by the electronic control unit, to drive when the charger and the external power supply are connected, controlling the first DC-to-DC converter, by the electronic control unit, to drive and perform first power feeding control so as to feed electric power to the low voltage system power line when the charger is driven and the low voltage battery has to be charged, and when the charger is driven, electric power from the external power supply is equal to or less than first predetermined electric power, and the first power feeding control is performed, controlling the charger, by the electronic control unit, to i) continue the drive of the charger when a first predetermined time has not elapsed from the start of the first power feeding control, ii) continue the drive of the charger when charged electric power of the high voltage battery is greater than second predetermined electric power after the first predetermined time has elapsed from the start of the first power feeding control, the second predetermined electric power being smaller than the first predetermined electric power, and iii) stop the drive of the charger when the charged electric power of the high voltage battery is equal to or less than the second predetermined electric power after the first predetermined time has elapsed from the start of the first power feeding control.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Next, a mode for carrying out the present disclosure will be described in connection with an example.

Figure 1:
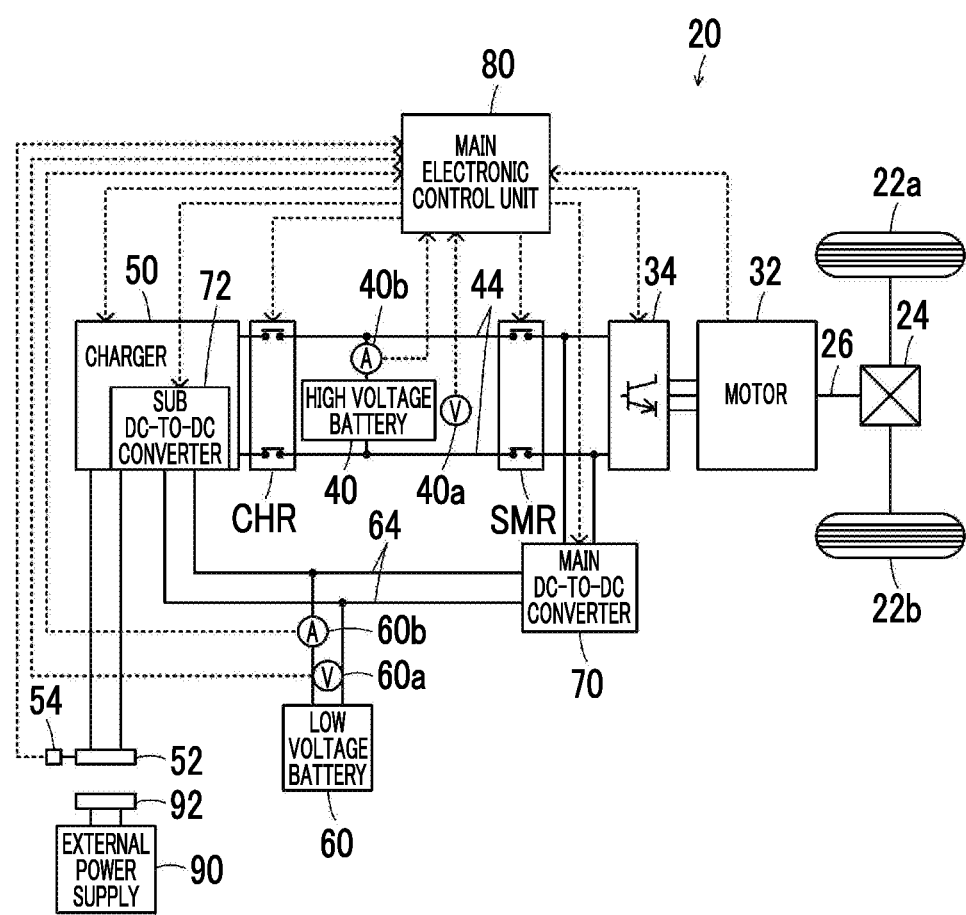
FIG. 1 is a configuration diagram showing the outline of the configuration of an electric vehicle 20 as an example of the present disclosure.

FIG. 1 is a configuration diagram showing the outline of the configuration of an electric vehicle 20 as an example of the present disclosure. As shown in the drawing, the electric vehicle 20 of the example is provided with a motor 32, an inverter 34, a high voltage battery 40, a charger 50, a low voltage battery 60, a main DC-to-DC converter 70, a sub DC-to-DC converter 72, a system main relay SMR, a charging relay CHR, and a main electronic control unit (hereinafter, referred to as a "main electronic control unit") 80.

The motor 32 is constituted as, for example, a synchronous motor generator, and is connected to a drive shaft 26 coupled to drive wheels 22a, 22b through a differential gear 24. The inverter 34 is used for driving the motor 32, and is connected to a high voltage system power line 44. The motor 32 is rotationally driven through switching control of a plurality of switching elements (not shown) of the inverter 34 by the main electronic control unit 80. The high voltage battery 40 is constituted as, for example, a lithium-ion secondary battery or a nickel-hydrogen secondary battery having a rated voltage of 200 V, 250 V, 300 V, or the like, and is connected to the inverter 34 through the high voltage system power line 44 as described above.

The charger 50 is connected to the high voltage system power line 44 and is configured to charge the high voltage battery 40 using electric power from an external power supply 90 when a vehicle-side connector 52 is connected to a power supply-side connector 92 of the external power supply 90. The charger 50 supplies electric power from the external power supply 90 to the high voltage battery 40 side under the control of the main electronic control unit 80 when the vehicle-side connector 52 is connected to the power supply-side connector 92.

The low voltage battery 60 is constituted as, for example, a lead storage battery having a rated voltage of 12 V or the like, and is connected to a low voltage system power line 64. A plurality of accessories, such as a headlight, a room lamp, an audio system, a power window, and a seat heater, and an electronic control unit, such as the main electronic control unit 80, are also connected to the low voltage system power line 64.

The main DC-to-DC converter 70 is connected to the high voltage system power line 44 and the low voltage system power line 64. The main DC-to-DC converter 70 supplies the electric power of the high voltage system power line 44 to the low voltage system power line 64 with deboosting a voltage under the control of the main electronic control unit 80.

The sub DC-to-DC converter 72 is constituted as a DC-to-DC converter having a rated output smaller than that of the main DC-to-DC converter 70. The sub DC-to-DC converter 72 is connected to the high voltage system power line 44 on the charger 50 side from the main DC-to-DC converter 70 and the low voltage system power line 64. In the example, it is assumed that the sub DC-to-DC converter 72 is incorporated in the charger 50. The sub DC-to-DC converter 72 supplies the electric power of the high voltage system power line 44 to the low voltage system power line 64 with deboosting a voltage under the control of the main electronic control unit 80.

The system main relay SMR is provided between the high voltage battery 40 and the inverter 34 or the main DC-to-DC converter 70 in the high voltage system power line 44, and is turned on and off to connect or release the connection of the high voltage battery 40 side and the inverter 34 or the main DC-to-DC converter 70 side under the control of the main electronic control unit 80.

The charging relay CHR is provided between the high voltage battery 40 and the charger 50 or the sub DC-to-DC converter 72 in the high voltage system power line 44, and is turned on and off to connect or release the connection of the high voltage battery 40 side and the charger 50 or the sub DC-to-DC converter 72 side under the control of the main electronic control unit 80.

Though not shown, the main electronic control unit 80 is constituted as a microprocessor centering on a CPU, and is provided with, in addition to the CPU, a ROM which stores a processing program, a RAM which temporarily stores data, an input/output port, and the like. To the main electronic control unit 80, signals from various sensors are input through the input port.

As the signals which are input to the main electronic control unit 80, for example, a rotation position of a rotor of the motor 32 from a rotation position sensor configured to detect the rotation position of the rotor of the motor 32, a voltage Vb1 from a voltage sensor 40a attached between terminals of the high voltage battery 40, a current Ib1 from a current sensor 40b attached to an output terminal of the high voltage battery 40, and the like can be exemplified. Signals from various sensors attached to the charger 50, a connection signal from a connection switch 54 attached to the vehicle-side connector 52 and configured to determine whether or not the vehicle-side connector 52 and the power supply-side connector 92 of the external power supply 90 are connected, and the like can also be exemplified. Furthermore, a voltage Vb2 from a voltage sensor 60a attached between terminals of the low voltage battery 60, a current Ib2 from a current sensor 60b attached to an output terminal of the low voltage battery 60, and the like can also be exemplified. In addition, an ignition signal from an ignition switch, a shift position SP from a shift position sensor, an accelerator pedal angle from an accelerator pedal position sensor, a brake pedal position from a brake pedal position sensor, a vehicle speed from a vehicle speed sensor, and the like can also be exemplified.

From the main electronic control unit 80, various control signals are output through the output port. As the signals which are output from the main electronic control unit 80, for example, a switching control signal to a plurality of switching elements of the inverter 34, a control signal to the charger 50, control signals to a plurality of accessories, a control signal to the main DC-to-DC converter 70, a control signal to the sub DC-to-DC converter 72, a control signal to the system main relay SMR, a control signal to the charging relay CHR, and the like can be exemplified.

The main electronic control unit 80 calculates a power storage ratio SOC1 of the high voltage battery 40 based on an integrated value of the current Ib1 of the high voltage battery 40 from the current sensor 40b, or calculates a power storage ratio SOC2 of the low voltage battery 60 based on an integrated value of the current Ib2 of the low voltage battery 60 from the current sensor 60b.

In the electric vehicle 20 of the example configured as above, when the vehicle is parked at home or a charging point, such as a charging station, if the vehicle-side connector 52 and the power supply-side connector 92 of the external power supply 90 are connected, the main electronic control unit 80 turns on the charging relay CHR to drive (control) the charger 50 such that the charger 50 feeds electric power to (charges) the high voltage battery 40 using electric power from the external power supply 90 or feeds electric power to the low voltage system power line 64 through the main DC-to-DC converter 70 or the sub DC-to-DC converter 72.

When the vehicle-side connector 52 and the external power supply 90 are connected to drive the charger 50, the main electronic control unit 80 performs sub-power feeding control for feeding electric power to the low voltage system power line 64 by driving the sub DC-to-DC converter 72 or performs main power feeding control for feeding electric power to the low voltage system power line 64 by driving the main DC-to-DC converter 70. In the example, the main electronic control unit 80 performs the sub-power feeding control or the main power feeding control under a condition that the rated output of the sub DC-to-DC converter 72 is smaller than the rated output of the main DC-to-DC converter 70. Specifically, when the low voltage battery 60 does not need to be charged (the voltage Vb2 or the power storage ratio SOC2 of the low voltage battery 60 is equal to or greater than a threshold), the main electronic control unit 80 performs the sub-power feeding control. When the low voltage battery 60 has to be charged (the voltage Vb2 or the power storage ratio SOC2 of the low voltage battery 60 decreases to be less than the threshold), the main electronic control unit 80 performs the main power feeding control. In order to perform the main power feeding control, the system main relay SMR needs to be turned on. In the example, if the main power feeding control starts, even if charging of the low voltage battery 60 is completed (the low voltage battery 60 does not need to be charged), the main power feeding control is continued (is not switched to the sub-power feeding control).

Figure 2:
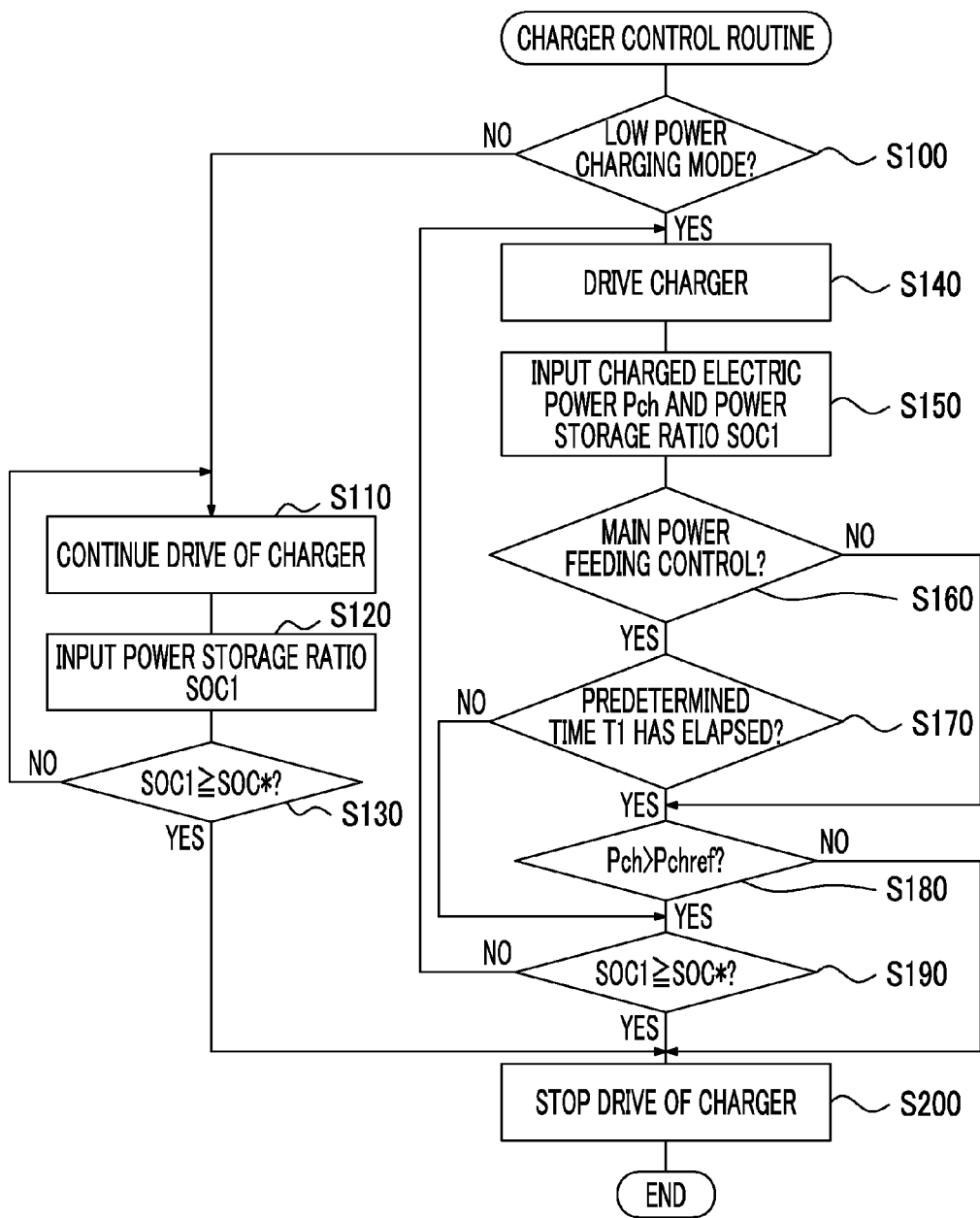
FIG. 2 is a flowchart showing an example of a charger control routine which is executed by a main electronic control unit 80 of the example.

Next, the operation of the electric vehicle 20 of the example configured as above, in particular, the control (drive or stop) of the charger 50 will be described. FIG. 2 is an explanatory view showing an example of a charger control routine which is executed by the main electronic control unit 80 of the example. This routine is executed when the vehicle-side connector 52 and the power supply-side connector 92 of the external power supply 90 are connected to start the drive of the charger 50.

If the charger control routine is executed, the main electronic control unit 80 first determines whether or not a low power charging mode is executed (Step S100). In the example, supply electric power Pps from the external power supply 90 is compared with a threshold Ppsref, and when the supply electric power Pps from the external power supply 90 is greater than the threshold Ppsref, it is determined that the low power charging mode is not executed, and when the supply electric power Pps from the external power supply 90 is equal to or less than the threshold Ppsref, it is determined that the low power charging mode is executed. The threshold Ppsref is an example of first predetermined electric power. The supply electric power Pps from the external power supply 90 can be input from an external charging device provided with the external power supply 90 through communication and used or the input electric power of the charger 50 can be input as the supply electric power Pps and used. In regard to the threshold Ppsref, for example, 800 W, 900 W, 1000 W, or the like can be used.

When it is determined in Step S100 that the low power charging mode is not executed, the drive of the charger 50 is continued (Step S110). Then, the power storage ratio SOC1 of the high voltage battery 40 is input (Step S120). In regard to the power storage ratio SOC1 of the high voltage battery 40, a value calculated based on the integrated value of the current Ib1 of the high voltage battery 40 from the current sensor 40b is input.

If the power storage ratio SOC1 of the high voltage battery 40 is input in this way, the input power storage ratio SOC1 is compared with a target ratio SOC* (Step S130), and when the power storage ratio SOC1 of the high voltage battery 40 is less than the target ratio SOC*, the process returns to Step S110. Then, the processing of Steps S110 to S130 is repeatedly executed, if the power storage ratio SOC1 of the high voltage battery 40 becomes equal to or greater than the target ratio SOC* in Step S130, the drive of the charger 50 is stopped (Step S200), and this routine ends. The target ratio SOC* is determined as the power storage ratio SOC1 at which charging of the high voltage battery 40 ends, and for example, 80%, 85%, 90%, or the like can be used.

When it is determined in Step S100 that the low power charging mode is executed, the drive of the charger 50 is continued (Step S140). Then, charged electric power Pch and the power storage ratio SOC1 of the high voltage battery 40 are input (Step S150). An input method of the power storage ratio SOC1 of the high voltage battery 40 has been described above. In regard to the charged electric power Pch of the high voltage battery 40, a value (a value on the charging side of the high voltage battery 40 is positive) calculated as a product of the voltage Vb1 of the high voltage battery 40 from the voltage sensor 40a and the current Ib1 of the high voltage battery 40 from the current sensor 40b is input.

Subsequently, it is determined whether to perform the main power feeding control (or first power feeding control) or the sub-power feeding control (or second power feeding control) (Step S160). This determination can be performed, for example, by reading a flag for which a value of 1 is set when the main power feeding control is performed and a value of 0 is set when the sub-power feeding control is performed and by examining the value. When it is determined that the main power feeding control is performed, it is determined whether or not a predetermined time T1 has elapsed from the start of the main power feeding control (Step S170). The predetermined time T1 is determined as a time required for charging the low voltage battery 60 through the main power feeding control (required until the voltage Vb2 or the power storage ratio SOC2 becomes equal to or greater than the threshold) or a time slightly longer than the time, and for example, 25 minutes, 30 minutes, 35 minutes, or the like can be used. The predetermined time T1 is an example of a first predetermined time.

While it is determined in Step S160 that the main power feeding control is performed, when it is determined in Step S170 that the predetermined time T1 has not elapsed from the start of the main power feeding control, the power storage ratio SOC1 of the high voltage battery 40 is compared with the target ratio SOC* (Step S190). Then, when the power storage ratio SOC1 of the high voltage battery 40 is less than the target ratio SOC*, the process returns to Step S140, and when the power storage ratio SOC1 of the high voltage battery 40 is equal to or greater than the target ratio SOC*, the drive of the charger 50 is stopped (Step S200) and this routine ends.

When the processing of Steps S140 to S170 and S190 is repeatedly executed, and when it is determined in Steps S160 and S170 that the predetermined time T1 has elapsed from the start of the main power feeding control, the charged electric power Pch of the high voltage battery 40 is compared with a threshold Pchref smaller than the above-described threshold Ppsref (Step S180). The threshold Pchref is a threshold which is used to determine whether or not the high voltage battery 40 is charged with a certain amount of electric power, and for example, 200 W, 250 W, 300 W, or the like can be used. The threshold Pchref is an example of second predetermined electric power.

When it is determined in Steps S160 and S170 that the predetermined time T1 has elapsed from the start of the main power feeding control, when the charged electric power Pch of the high voltage battery 40 is greater than the threshold Pchref in Step S180, it is determined that the high voltage battery 40 is charged with a certain amount of electric power, and processing after Step S190 is executed.

When it is determined in Steps S160 and S170 that the predetermined time T1 has elapsed from the start of the main power feeding control, when the charged electric power Pch of the high voltage battery 40 is equal to or less than the threshold Pchref in Step S180, it is determined that the high voltage battery 40 is not charged with a certain amount of electric power, even if the power storage ratio SOC1 of the high voltage battery 40 is less than the target ratio SOC*, the drive of the charger 50 is stopped (Step S200), and this routine ends.

When the main power feeding control is performed in the low power charging mode (when the low voltage battery 60 has to be charged), since it is necessary to supply comparatively large electric power to the low voltage system power line 64, the charged electric power Pch of the high voltage battery 40 may become comparatively small temporarily (over a certain amount of time) (for example, becomes near zero or minus). In a case where the drive of the charger 50 is stopped when the charged electric power Pch of the high voltage battery 40 becomes comparatively small, there is a possibility that charging of the high voltage battery 40 is not sufficiently performed. In the example, when the predetermined time T1 has not elapsed from the start of the main power feeding control, even if the charged electric power Pch of the high voltage battery 40 is equal to or less than the threshold Pchref, the drive of the charger 50 is continued (the drive of the charger is not stopped). With this, when the low power charging mode is executed, it is possible to prevent the drive of the charger 50 from being stopped without sufficiently charging the high voltage battery 40.

After the predetermined time T1 has elapsed from the start of the main power feeding control, charging of the low voltage battery 60 is completed, it is not necessary to supply very large electric power to the low voltage system power line 64, and it is considered that the charged electric power Pch of the high voltage battery 40 becomes large to some extent. Accordingly, when the charged electric power Pch of the high voltage battery 40 is equal to or less than the threshold Pchref after the predetermined time T1 has elapsed from the start of the main power feeding control, it is considered that any abnormality occurs or the operation of an accessory (an accessory having comparatively large power consumption) connected to the low voltage system power line 64 is continued. For this reason, the drive of the charger 50 is stopped, thereby preventing wasteful power feeding from the external power supply from being continued.

When it is determined in Step S160 that the sub-power feeding control is performed, the charged electric power Pch of the high voltage battery 40 is compared with the threshold Pchref constantly (regardless of whether or not the predetermined time T1 has elapsed from the start of the sub-power feeding control) (Step S180), when the charged electric power Pch of the high voltage battery 40 is greater than the threshold Pchref, the processing after Step S190 is executed, and when the charged electric power Pch of the high voltage battery 40 is equal to or less than the threshold Pchref, the drive of the charger 50 is stopped (Step S200) and this routine ends.

When the sub-power feeding control is performed in the low power charging mode (when it is not necessary to supply electric power greater than predetermined electric power to the low voltage system power line 64), basically, it is considered that the charged electric power Pch of the high voltage battery 40 is greater than the threshold Pchref. Accordingly, when the charged electric power Pch of the high voltage battery 40 is equal to or less than the threshold Pchref, it is considered that any abnormality is likely to occur. For this reason, the drive of the charger 50 is stopped, thereby preventing wasteful power feeding from the external power supply from being continued.

In the electric vehicle 20 of the example described above, when the charger 50 is driven in the low power charging mode and the main power feeding control is performed, and when the predetermined time T1 has not elapsed from the start of the main power feeding control and when the charged electric power Pch of the high voltage battery 40 is greater than the threshold Pchref after the predetermined time T1 has elapsed from the start of the main power feeding control, the drive of the charger 50 is continued. That is, when the predetermined time T1 has not elapsed from the start of the main power feeding control, even when the charged electric power Pch of the high voltage battery 40 is equal to or less than the threshold Pchref, the drive of the charger 50 is continued. With this, when the low power charging mode is executed, it is possible to prevent the drive of the charger from being stopped without sufficiently charging the high voltage battery.

When the charged electric power Pch of the high voltage battery 40 is equal to or less than the threshold Pchref after the predetermined time T1 has elapsed from the start of the main power feeding control, the drive of the charger 50 is stopped. With this, it is possible to prevent wasteful power feeding from the external power supply from being continued.

In the electric vehicle 20 of the example, when the charger 50 is driven in the low power charging mode and the sub-power feeding control is performed, the charged electric power Pch of the high voltage battery 40 is compared with the threshold Pchref constantly. However, when the charger 50 is driven in the low power charging mode and the sub-power feeding control is performed, and when a predetermined time T2 has not elapsed from the start of the sub-power feeding control, the charged electric power Pch of the high voltage battery 40 may not be compared with the threshold Pchref. That is, when the sub-power feeding control is performed, the electronic control unit is configured to compare the charged electric power Pch of the high voltage battery 40 with the threshold Pchref after the predetermined time T2 has elapsed from the start of the sub-power feeding control. Considering that the sub-power feeding control is performed when the low voltage battery 60 does not need to be charged (the voltage Vb2 or the power storage ratio SOC2 of the low voltage battery 60 is equal to or greater than the threshold), the predetermined time T2 may be a time shorter than the predetermined time T1. The predetermined time T2 is an example of a second predetermined time.

Figure 3:
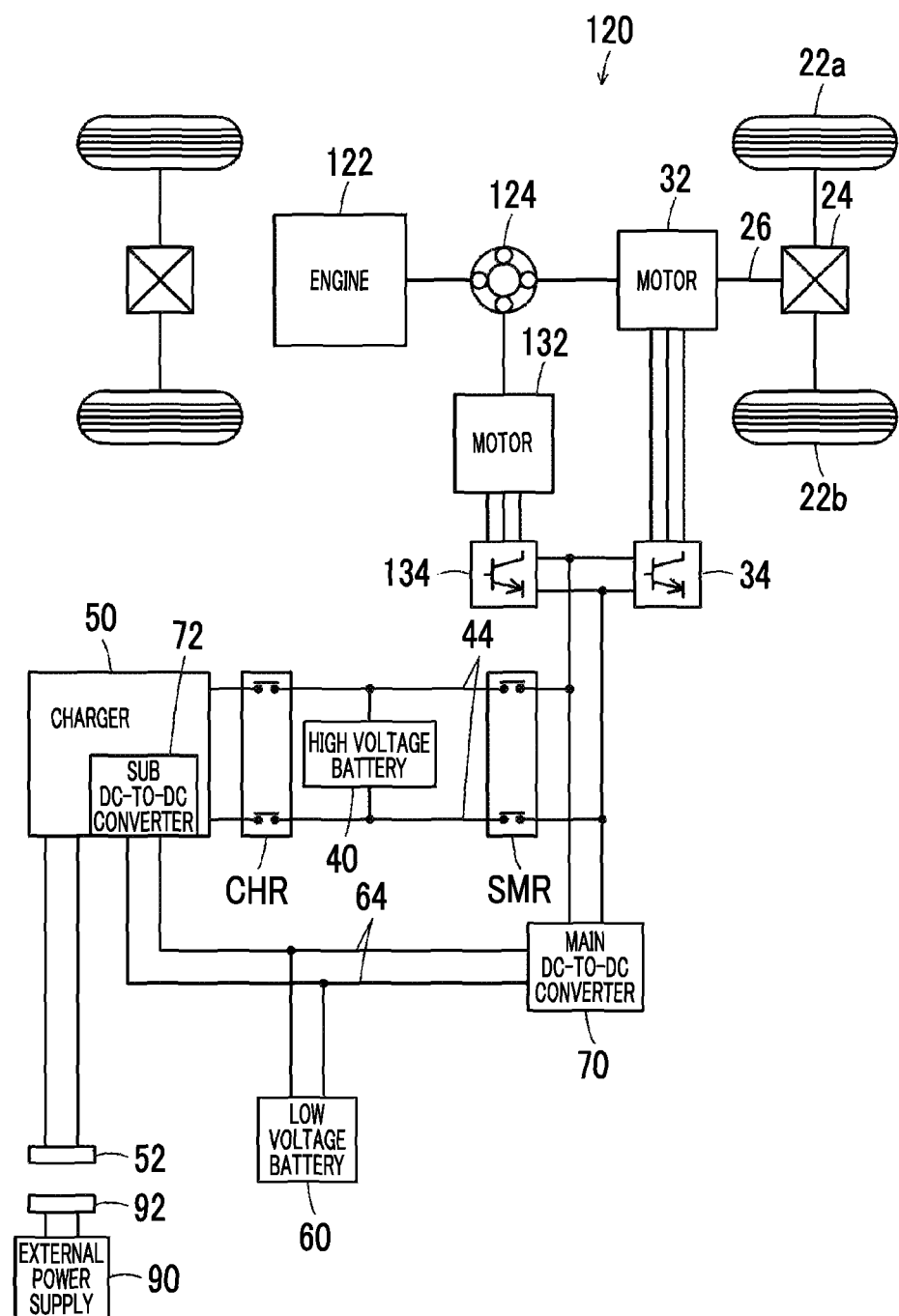
FIG. 3 is a configuration diagram showing the outline of the configuration of a hybrid vehicle 120 of a modification example.

In the electric vehicle 20 of the example, a configuration has been made in which the motor 32, the inverter 34, the high voltage battery 40, the charger 50, the low voltage battery 60, the main DC-to-DC converter 70, and the sub DC-to-DC converter 72 are provided. However, as shown in a hybrid vehicle 120 of a modification example of FIG. 3, a configuration may be made in which, in addition to the motor 32, the inverter 34, the high voltage battery 40, the charger 50, the low voltage battery 60, the main DC-to-DC converter 70, and the sub DC-to-DC converter 72, an engine 122, a planetary gear 124, a motor 132, and an inverter 134 are provided. The motor 132 is connected to a sun gear of the planetary gear 124, the engine 122 is connected to a carrier of the planetary gear 124, and a drive shaft 26 and the motor 32 are connected to a ring gear of the planetary gear 124. The inverter 34 is used for driving the motor 132, and is connected to the high voltage system power line 44 along with the inverter 34.

In the example, the motor 32 corresponds to a "motor", the high voltage battery 40 corresponds to a "high voltage battery", the charger 50 corresponds to a "charger", the low voltage battery 60 corresponds to a "low voltage battery", the main DC-to-DC converter 70 corresponds to a "first DC-to-DC converter", the sub DC-to-DC converter 72 corresponds to a "second DC-to-DC converter", and the main electronic control unit 80 corresponds to "control means".

Although the mode for carrying out the present disclosure has been described above in connection with the example, the example is merely a specific example for carrying out the present disclosure. The present disclosure is not limited to the example, and can be of course carried out in various forms without departing from the spirit and scope of the present disclosure.

The present disclosure is usable in a manufacturing industry of a vehicle.

What is claimed is:

1. A vehicle comprising:
  a motor for traveling;
  a high voltage battery connected to the motor through a high voltage system power line;
  a charger connected to the high voltage system power line and configured to charge the high voltage battery using electric power from an external power supply;
  a low voltage battery connected to a low voltage system power line;
  a first DC-to-DC converter connected to the high voltage system power line and the low voltage system power line, the first DC-to-DC converter being configured to supply electric power of the high voltage system power line to the low voltage system power line with deboosting a voltage;
  a second DC-to-DC converter connected to a location of the high voltage system power line on a charger side from the first DC-to-DC converter and the low voltage system power line, the second DC-to-DC converter having a rated output smaller than a rated output of the first DC-to-DC converter, and the second DC-to-DC converter being configured to supply electric power of the high voltage system power line to the low voltage system power line with deboosting a voltage; and
  an electronic control unit configured to control the charger to charge when the charger and the external power supply are connected, the electronic control unit being configured to perform first power feeding control so as to feed electric power to the low voltage system power line with the first DC-to-DC converter when the charger is charging and when the low voltage battery has to be charged,
  wherein, when the charger is charging, electric power from the external power supply is equal to or less than first predetermined electric power, and the first power feeding control is being performed, the electronic control unit is configured to
    i) control the charger such that charging is continued when a first predetermined time has not elapsed from a start of the first power feeding control,
    ii) control the charger such that charging is continued when charged electric power of the high voltage battery is greater than second predetermined electric power after the first predetermined time has elapsed from the start of the first power feeding control, the second predetermined electric power being smaller than the first predetermined electric power, and
    iii) control the charger such that charging is stopped when the charged electric power of the high voltage battery is equal to or less than the second predetermined electric power after the first predetermined time has elapsed from the start of the first power feeding control.

2. The vehicle according to claim 1,
  wherein, the electronic control unit is configured to perform second power feeding control so as to feed electric power to the low voltage system power line with the second DC-to-DC converter when the charger is charging and the low voltage battery does not need to be charged,
  the electronic control unit is configured to control the charger to continue charging when the charger is charging, electric power from the external power supply is equal to or less than the first predetermined electric power, the second power feeding control is performed, and the charged electric power of the high voltage battery is greater than the second predetermined electric power, and
  the electronic control unit is configured to control the charger to stop charging when the charger is charging, electric power from the external power supply is equal to or less than the first predetermined electric power, the second power feeding control is performed, and the charged electric power of the high voltage battery is equal to or less than the second predetermined electric power.

3. The vehicle according to claim 2,
  wherein, the electronic control unit is configured to compare the charged electric power of the high voltage battery with the second predetermined electric power after a second predetermined time has elapsed from the start of the second power feeding control while the second power feeding control is performed, and the second predetermined time is a time shorter than the first predetermined time.

4. A control method for a vehicle including
  a motor for traveling,
  a high voltage battery connected to the motor through a high voltage system power line,
  a charger connected to the high voltage system power line and configured to charge the high voltage battery using electric power from an external power supply,
  a low voltage battery connected to a low voltage system power line,
  a first DC-to-DC converter connected to the high voltage system power line and the low voltage system power line, the first DC-to-DC converter being configured to supply electric power of the high voltage system power line to the low voltage system power line with deboosting a voltage,
  a second DC-to-DC converter connected to a location of the high voltage system power line on a charger side from the first DC-to-DC converter and the low voltage system power line, the second DC-to-DC converter having a rated output smaller than a rated output of the first DC-to-DC converter, and the second DC-to-DC converter being configured to supply electric power of the high voltage system power line to the low voltage system power line with deboosting a voltage, and
  an electronic control unit, the control method comprising:
controlling the charger, by the electronic control unit, to charge when the charger and the external power supply are connected;
controlling the first DC-to-DC converter, by the electronic control unit, to perform first power feeding control so as to feed electric power to the low voltage system power line when the charger is charging and the low voltage battery has to be charged; and
when the charger is charging, electric power from the external power supply is equal to or less than first predetermined electric power, and the first power feeding control is performed, controlling the charger, by the electronic control unit, to
   i) continue charging when a first predetermined time has not elapsed from a start of the first power feeding control,
   ii) continue charging when charged electric power of the high voltage battery is greater than second predetermined electric power after the first predetermined time has elapsed from the start of the first power feeding control, the second predetermined electric power being smaller than the first predetermined electric power, and
   iii) stop charging when the charged electric power of the high voltage battery is equal to or less than the second predetermined electric power after the first predetermined time has elapsed from the start of the first power feeding control.

* * * * *